Sept. 10, 1968  G. R. COWAN ET AL  3,401,019
PROCESS FOR SYNTHESIZING DIAMOND
Filed Nov. 21, 1966
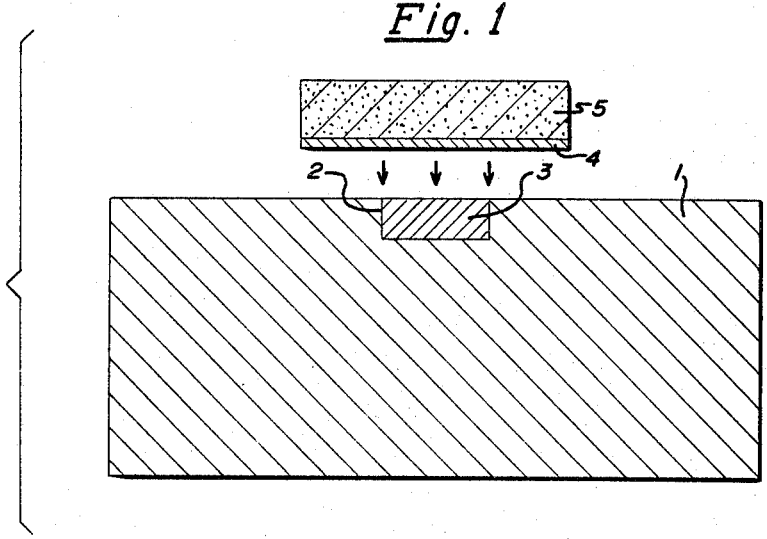
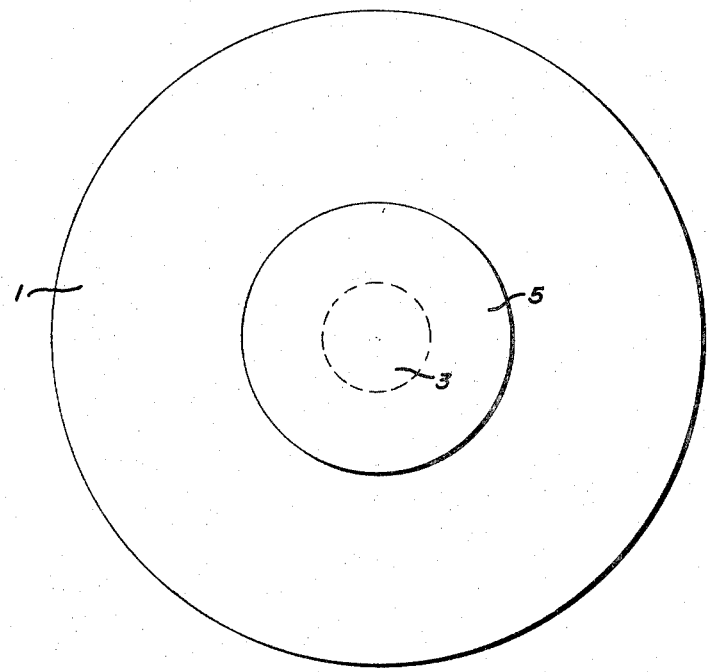
INVENTORS
GEORGE R. COWAN
BRUCE W. DUNNINGTON
ARNOLD H. HOLTZMAN
ATTORNEY

3,401,019
PROCESS FOR SYNTHESIZING DIAMOND

George R. Cowan, Woodbury, N.J., Bruce W. Dunnington, Penn Wood, West Chester, Pa., and Arnold H. Holtzman, Cherry Hill Township, N.J., assignors to E. I. du Pont de Nemours and Company, Wilmington, Del., a corporation of Delaware
Continuation-in-part of application Ser. No. 516,824, Nov. 24, 1965. This application Nov. 21, 1966, Ser. No. 602,445
12 Claims. (Cl. 23—209.1)

ABSTRACT OF THE DISCLOSURE

An improved process and assembly for synthesizing diamond from carbon with high-pressure shock waves, and a novel crystalline form of diamond (i.e., hexagonal diamond) thus obtained. The improvement resides in shocking a mixture of the carbon and a cooling medium, i.e., a medium that will rapidly quench the diamond formed so that loss of diamond through graphitization is reduced, and the yield of the diamond product is correspondingly increased. As used herein, "carbon" means all of the elemental, nondiamond carbons, e.g., graphite, carbon black, charcoal, etc.

RELATED APPLICATIONS

This application is a continuation-in-part of our copending, but now abandoned application Ser. No. 516,824, filed Nov. 24, 1965, as a continuation-in-part of application Ser. No. 413,247, filed Nov. 23, 1964, and now abandoned, which was in turn a continuation of our copending application Ser. No. 388,753, filed Aug. 11, 1964, and now abandoned.

BACKGROUND OF THE INVENTION

Currently there are two methods whose ability to synthesize diamond from carbon has been demonstrated. One of these is the static method described, e.g., in U.S. 2,947,609 and 2,947,610, both issued Aug. 2, 1960. Although this method apparently produces diamond in reasonably good yields, it requires complex and expensive equipment to generate the temperatures and pressures needed to convert carbon to diamond. Also, such equipment inherently is of limited capacity. The other method, which is an attempt to reduce the expense of the conversion, is the shock-synthesis technique decribed in U.S. 3,238,019, issued Mar. 1, 1966. However, this method, wherein a block of carbon is explosively shocked to reaction temperatures and pressures, appears incapable of providing satisfactory yields of diamond. The low yields obtained by this shock-synthesis technique are believed attributable to excessive graphitization of the hot diamond particles, particularly upon release of shock pressure, when the shock pressure is high enough to initially convert a substantial quantity of the carbon to diamond.

DESCRIPTION OF THE INVENTION

It has now been found that graphitization during shock-synthesis can be reduced with the result that diamond can be obtained in higher yields, e.g., in terms of carbon converted to diamond and amount of diamond produced per unit of explosive employed, by a process which comprises passing a shock wave of sufficient intensity to cause transformation of carbon to diamond through a mixture of said carbon and a cooling medium. As used herein, a cooling medium is defined as a material whose maximum shock-induced temperature is (1) substantially less than the maximum temperature of the diamond formed as a result of the passage of said shock wave through said mixture, and (2) sufficiently low that the temperature differential attained produces an equilibration temperature at least below about 2000° C., and preferably below about 1800° C. In other words, the shock impedance and heat capacity (i.e., specific heat) of the cooling medium, and the quantity thereof employed, are such that the temperature attained upon equilibration of heat between the diamond formed and the cooling medium is at least below about 2000° C., and preferably below about 1800° C., and the thermal conductivity of the cooling medium is such that the rate of cooling of the diamond particles formed is sufficiently high to prevent excessive graphitization thereof.

In the conversion of carbon to diamond by shock, the high pressure produced in the carbon is transient in nature, i.e., of very short duration. The duration varies with the shock-producing conditions, but generally is on the order of about 0.1 to about 10 microseconds. The pressure falls rapidly thereafter, approaching atmospheric. Shocking also raises the carbon to its transformation temperature, and the mechanical work done as a result of the marked reduction in volume accompanying the carbon-to-diamond transition, causes the diamond formed to be hotter than the carbon and to remain, for some time after shock attenuation, at temperatures above its stability temperature at atmospheric pressure. In the present process, however, diamond is placed rapidly under stable conditions, thereby significantly reducing its graphitization.

Another aspect of this invention is a unique crystalline form of the element carbon as evidenced by X-ray and electron diffraction analyses. In particular, diamond crystals synthesized by shocking a mixture of cooling medium and high-density graphite, i.e., graphite compacted to a density greater than about 1.70 grams/cc., which is about 75% of its theoretical density, in mixture with a cooling medium, contain layer stacking sequences having hexagonal symmetry and four carbon atoms per elementary cell, in addition to sequences having the well-known cubic symmetry, eight carbon atoms per elementary cell, and a lattice constant of 3.570 A. The former represent a new diamond phase which is in the primitive hexagonal form, has the lattice dimensions $a=2.524$ A. and $c=4.122$ A. and contains the four carbon atoms per elementary cell in the positions $\frac{1}{3}, \frac{2}{3}, z; \frac{2}{3}, \frac{1}{3}, \bar{z}; \frac{2}{3}, \frac{1}{3}, \frac{1}{2}+z; \frac{1}{3}, \frac{2}{3}, \frac{1}{2}-z$; with $z=\frac{1}{16}$. The diamond crystals prepared as just described usually are mixed structures of the cubic and hexagonal forms in varying amounts; however, some crystals are 100% hexagonal modification.

The synthetic diamond prepared by the process of this invention has an average particle size, e.g., about 8 microns or above, that is useful for conventional industrial purposes, e.g., in abrasive wheels, polishing and lapping compositions, etc., and in many applications affords distinct advantages over diamonds heretofore known to the art, particularly with respect to less time and material requirement to achieve desired results.

Also included within the scope of this invention is an assembly for the shock synthesis of diamond, which is characterized by having carbon in admixture with a cooling medium as described above. This assembly will be better understood by referring to the accompanying drawing, wherein FIGURE 1 is a cross-sectional view of an assembly according to this invention; and FIGURE 2 is a plan view of the assembly of FIGURE 1. These figures will be described in greater detail following discussion of the parameters affecting the process of the invention.

The type of carbon used in admixture with the cooling medium is not critical and may be artificial or natural graphite, carbon black (e.g., acetylene black), charcoal (e.g., bone or wood char) or coke. Graphite is the generally preferred carbon because of the ease with which it can be compacted to the desired density. Also, unlike the basically non-graphitic carbons, graphite does not contain significant quantities of volatile impurities which may cause the sample to explode at the shock-induced temperatures and pressures encountered during diamond synthesis. For this reason, when non-graphitic carbons are employed, they preferably are heated under vacuum before shocking to drive off the volatile impurities.

Conversion of the carbon particles in the mixture to diamond particles is effected by subjecting them to a shock wave having sufficient pressure, and concurrently causing a sufficiently high temperature, for the carbon-to-diamond transition to occur. The transition occurs at different pressure-temperature conditions depending on the density of the carbon particles and the shock impedance of the cooling medium. The term "shock impedance" as used herein refers to the resistance of a material to motion produced by an applied pressure. It is defined as the ratio of the change in applied pressure to the change in material velocity. When the material is compressed by a shock wave, the shock impedance is equal to the initial density of the material times the velocity of the shock wave passed through it, and thus varies with pressure. With a high-impedance cooling medium and high-density carbon (carbon compacted to a density of at least about 1.70 g./cc.), e.g., the iron and graphite in cast iron, an average shock pressure of at least about 750 kilobars, and preferably about 1000–2000 kilobars, should be introduced into the carbon mixture. For a given shock pressure, use of a lower-density carbon or a lower-impedance cooling medium will result in a higher temperature in the carbon. With such materials, it is not to be expected that pressures as high as those required with high-impedance materials will be needed, since the higher temperatures compensate for the lower pressures. In fact, with lower-impedance cooling media and/or lower-density carbon, conversion may occur at a shock pressure as low as 200 kilobars. It is to be understood that the shock pressure referred to herein is the average pressure introduced into the mixture.

The carbon particles are mixed and in intimate contact with a cooling medium which cools the diamond formed to the degree that the temperature attained upon equilibration of heat between the diamond and the cooling medium is below that at which rapid graphitization of diamond occurs at atmospheric pressure, believed to be about 2000° C. For most efficient use of a given amount of a particular cooling medium, the carbon and cooling medium should be uniformly admixed. The equilibration temperature attained is dependent on the shock-induced temperature of the cooling medium, its heat capacity, and the quantity thereof present, a lower equilibration temperature being achieved with a cooling medium which attains a lower shock temperature, has a higher heat capacity, and is present in larger quantity. Consequently, the temperature of the cooling medium on shocking should be below 2000° C., and preferably well below this temperature. Published data are available for the temperature in various materials after shocking to different pressures and release of the pressure by passage of an isentropic expansion wave. For example, R. G. McQueen and S. P. Marsh give values for nineteen metals in Journal of Applied Physics, vol. 31, pages 1253–1269 (1960). The temperature attained by a specific material after shocking can be estimated from a knowledge of the Hugoniot shock compression curve, heat capacity, and Grüneisen ratio for the material as described by McQueen and Marsh (loc. cit.).

The temperature attained by the diamond under the various conditions used to shock the carbon-cooling medium mixtures, and therefore the temperature from which the diamond must be cooled, is not known with certainty. The average temperature can be estimated, however, using the Mie-Grüneisen equation of state (Grüneisen constant of 0.9) and the Dugdale-MacDonald relationship as described by McQueen and Marsh (loc. cit.) and Deal (Modern Very High Pressure Techniques, Wentorf, R. H., Jr. Editor, London, Butterworths, 1962, pages 200–207), the published sonic velocity of diamond being used for the shock velocity in this estimation. In this manner it is estimated that the diamond produced by the present process generally must be cooled from a temperature above 2000° C. For example, diamond at a temperature of about 3200° K. is estimated to result when carbon having a density of about 1.70 g./cc. is shocked to 400 kilobars, and diamond at about 2700° K. when such carbon is shocked to 300 kilobars. While higher-density carbon shocked to these pressures would result in lower diamond temperatures, the fact that no significant recovery of diamond is achieved under these conditions shows that higher pressures are required with very high-density carbon.

The temperature of diamond formed by shocking cast iron can be estimated on the basis of a model consisting of alternating layers of iron and graphite of 100% density. Considered in this manner, a steel plate striking the iron layer at a velocity of 4.1 kilometers per second would introduce a shock of about 1130 kilobars into the the iron layer and about 490 kilobars into the graphite at the first iron-graphite interface, producing an estimated diamond temperature of 2400° K., assuming the transition takes place as a result of the first shock. The final diamond temperature may be higher, however, since the graphite-to-diamond transition may not occur until subsequent shocks thereby leaving the diamond at a higher final temperature due to the occurrence of the volume change at higher pressures.

The requirement that the maximum shock-induced temperature of the cooling medium be less than 2000° C., and in any event less than the maximum temperature reached by the diamond, places an upper limit on the shock pressures which may be used to effect the carbon-to-diamond transition with any particular cooling medium. For example, with a material such as tungsten, a pressure of 2100 kilobars produces a temperature of 1800° C. and such pressure thus can be employed. On the other hand, since a pressure of 1200 kilobars produces a temperature of 2147° C. in tin, such pressure should not be employed with this medium.

The lower the shock impedance of a material and the lower its heat capacity, the hotter the material becomes on shocking to a given pressure. While the better cooling media are those having both a high shock impedance, e.g., about $3 \times 10^6$ dyn-sec./cm.$^3$ or higher and a high heat capacity, e.g., about 0.1 cal./g./° C. or higher, materials high in one property and low in the other can also be effective, e.g., as in the case of aluminum and tungsten. In general, materials having a shock impedance below about $0.7 \times 10^6$ at zero pressure are not practical. The temperature which the cooling medium will attain upon shocking to a given pressure also depends on the porosity of the medium, higher porosities giving higher shock temperatures. For this reason the cooling medium will generally have a density of at least 85%, and preferably at least 90%, of its theoretical density. These densities are in terms of the actual weight of the cooling medium divided by its volume exclusive of pores containing carbon.

The rate at which the diamond particles will need to be cooled in any particular case will vary depending on the temperature of the particles and the duration of the elevated pressure, the diamond becoming thermodynamically unstable as the pressure falls, e.g. to below 100 kilobars. Use of conditions which give longer pressure durations permits less rapid cooling than use of conditions involving shorter durations. When the pressure has fallen below that required to make diamond a thermodynamically stable phase, the diamond can be expected to decompose, the decomposition being more rapid at higher temperatures and lower pressures. Therefore, more rapid cooling is required at higher temperatures, whereas the time at more moderate temperatures can be somewhat longer. As a rule, the cooling time should be less than 0.1 second, and under conditions resulting in a maximum diamond temperature substantially above 2000° C., shorter cooling times will be required, e.g., on the order of about 0.001 second or less. Should the equilibration temperature be sufficiently high and the rate of cooling after equilibration be sufficiently low, e.g., as in the case of large sample volumes, that a significant degree of graphitization occurs after equilibration, external quenching of the sample may be employed, e.g., immersion in, or spraying with, water. With larger samples, much lower equilibration temperatures may be advisable.

The rate at which cooling is achieved depends on the particle size of the diamonds, smaller particles cooling more rapidly. For larger diamond particle sizes, it is desirable that the cooling medium have a heat capacity of at least about 0.1 cal./g./° C. and a thermal conductivity of at least about 0.1 cal./sec./cm.$-$° C. at room temperature. Faster cooling results with these conditions.

As has been stated previously, the equilibration temperature is dependent on the quantity of cooling medium employed, as well as on the maximum shock-induced temperature and heat capacity of the medium. Since the time required for the diamond to be placed in a stable region is less at lower equilibration temperatures, the rate of cooling also is dependent on these factors. Less cooling medium is required to obtained the necessary equilibration temperature at the necessary rate when the medium has a lower shock temperature and higher heat capacity. As a rule, however, better results are achieved when the carbon constitutes no more than about 85 percent by volume of the mixture, and in the case of more porous cooling media, about 65% by volume of the mixture.

The density of the carbon, i.e., the density of isolated carbon particles (e.g., the graphite in cast iron) or of agglomerated masses of carbon particles in the mixture, as the case may be, can vary widely. Densities as low as about 20% and as high as 100% of the theoretical density of graphite (i.e., about 0.45 and 2.26 g./cc., respectively) can be used. The lower the carbon density, the lower the pressure produced therein if the shock-producing conditions are held constant. If the shock-producing conditions are adjusted so as to produce the same pressure in high- and low-density carbon, a higher temperature is attained in the low-density carbon and in the resulting diamond, and consequently more efficient cooling conditions, i.e., faster cooling and/or longer pressure duration, are required.

The carbon density also has an influence on the effective shock pressure range in the present process, lower densities, e.g., about from 0.45 to 1.70 g./cc., giving higher yields of diamond under conditions producing lower shock pressures, e.g., as low as about 200 kilobars, whereas pressures of at least about 750 kilobars are preferred when the carbon density is high.

Taking into consideration the density of the cooling medium and of the carbon, and the composition of their mixture by volume, the mixture generally will have a minimum overall relative density as low as about 40% (taking 2.26 g./cc. as the theoretical density of carbon) with cooling media of substantially theoretical density, the minimum increasing as the density of a given cooling medium decreases.

The cooling medium will be a liquid, solid, or solid-liquid combination. On the basis of ease of handling and containment, solids are the preferred cooling media in the present process. Of the solids, materials having the necessary conductivity and desirable fragmentation-resistant properties are more commonly to be found among the metals, and these are preferred. Typical of the metals which can be used are, for example, iron, copper, nickel, aluminum, manganese, magnesium, tungsten, titanium, niobium, and alloys based on one or more of these metals, e.g., steel, brass, etc.

A cooling material will be selected on the basis of the factors described above as well as such considerations as the ease of handling and maintaining the mixture under the shock conditions employed, the ease of separating the cooling material from the diamond product, the cost of the cooling material, and the cost of forming the carbon mixture. Materials which are especially preferred on the basis of all factors considered together are iron, copper, nickel, and alloys based on one or more of these metals. A particularly convenient material for use as the mixture is cast iron, wherein graphite is dispersed in a matrix of ferrite or pearlite (ferrite plus iron carbide).

If the shock impedance of the cooling medium is higher than that of the carbon, the latter will attain its peak pressure cumulatively due to the reflection of compressive shocks back into the carbon from the medium-carbon interface. In such a situation, the peak pressure in the carbon can approach the pressure in the cooling medium. This cumulative shocking often is desirable since it does not produce the high peak temperatures associated with one-step shocking to the same pressure and thus involves less stringent cooling requirements. Thus, a medium having a higher shock impedance than the carbon represents a preferred embodiment in the present process. If the shock impedance of the cooling medium is less than that of the carbon, the carbon will attain its peak pressure in one step, this pressure being transiently higher that in the medium. In this case, the shock reflections are rarefactions.

The shock impedance of a material can be found from such relationships as $\rho_0 \cdot U_s$ and $P/U_p$ ($\rho_0$=initial density, $U_s$=shock velocity, $P$=shock pressure, $U_p$=particle velocity) as are found in the article by Deal, mentioned previously. The shock velocities and particle velocities attained on shocking metals to various pressures are given in the previously mentioned McQueen and Marsh publication. The required data for 95% dense graphite are given by B. J. Alder and R. H. Christian in Physical Review Letters, vol. 7, pages 367–9 (1961), No. 10, in terms of pressures and specific volumes. Since $$U_s{}^2 = (V_0)^2 \cdot \frac{P-P_0}{V_0-V}$$

($P_0$ and $V_0$ are initial pressure and specific volume, respectively), the shock impedance of the graphite can be obtained by using the term $$V_0 \cdot \sqrt{\frac{P-P_0}{V_0-V}}$$

for $U_s$ in the relationship $\rho_0 \cdot U_s$, i.e., the shock impedance equals $$\sqrt{\frac{P-P_0}{V_0-V}}$$

The mixture of carbon and cooling medium can be in the form of an essentially non-particulate body, e.g., a cast metal piece containing carbon particles, or the mixture can be particulate, e.g., in the form of a mixture of carbon powder and cooling medium powder or pellets compacted together. The cooling medium can form a substantially continuous matrix or skeleton within which the carbon particles are held, as in cast iron, but this structure is not required. As is seen from the following examples, the mixture can be made by compacting mixtures of carbon powder and metal shot. In such compacts it is possible to have a substantially continuous network of compacted carbon particles and/or a substantially continuous network of cooling medium particles, the density of the aggregated carbon in this structure being variable according to the compacting pressure employed. Whether the mixture is a casting or in the form of compressed particles appears per se to have no significant effect on the results obtained, provided the densities of the mixtures and the amount of coolant are equivalent, although the microstructure of the mixture, and specifically the structure of the carbon, influences the shape of the diamonds obtained. For example, in the case of pig iron or gray iron (a type of cast iron), the usual microstructure is a matrix of pearlite with graphite flakes dispersed throughout. Diamond produced therefrom is in the form of plates. On the other hand, use of nodular or ductile cast iron, in which the graphite is present as sperulites, yields diamond particles which are spherical or sections of spheres. Of the cast irons, pig or gray iron is preferred because, for a given total volume of diamond formed, there is more surface area in contact with the cooling medium.

The size of the carbon particles or regions in the carbon-containing mixture can vary widely. "Size" refers here to the minimum dimension of individual isolated particles or of isolated pockets of agglomerated particles, or the average minimum dimension of continuous veins of agglomerated particles. Mixtures in which the size of the particles, pockets, or veins exceeds about 500 microns generally are not preferred unless optimum cooling conditions and/or conditions under which a lower cooling rate can be tolerated are provided.

The particle size of the cooling medium when used in particulate form is not critical provided the required particle distribution and density, i.e., at least 85% of the theoretical density, can be achieved therewith.

The cooling medium performs a quenching or heat-sink function in the present process, taking no direct part in the carbon-to-diamond transformation per se, although its shock impedance has an effect on the pressure which can be achieved in the carbon. Because of the extremely short duration of the high pressure produced by shocking, i.e., generally on the order of about 0.1 to 10 microseconds, and consequently of the pressure-temperature conditions required for the transformation, there is insufficient time for interdiffusion of particles to occur and consequently insufficient time for the transformation to occur via a carbon dissolution and recrystallization route. Therefore the cooling medium cannot perform as a solvent for carbon or otherwise catalyze the transformation. Along these lines, it will be seen from the examples that follow that materials such as aluminum and copper, which do not catalyze the carbon-to-diamond transition under static pressure conditions such as are disclosed in U.S. Patents 2,947,609 and 2,947,610 (i.e., when the transformation occurs over periods measured in terms of seconds, minutes, and hours, or $10^6$ to $10^{10}$ times the pressure duration in shock systems), can be used as effective cooling media in the present process provided they meet the necessary conditions of shock impedance, heat capacity, low porosity, etc.

The shock wave required to effect the carbon-to-diamond transistion is introduced into the mixture by applying a shock pressure pulse over at least one surface of the mixture, "over" meaning that substantially the entire area of such surface is subjected to the pressure pulse. As used herein and in the claims, "shock pressure pulse" means a pressure pulse which: (a) is characterized by an almost instantaneous pressure rise and therefore can produce a shock wave in the carbon-containing mixture when applied over one of its surfaces; and (b) is applied to such surface of the mixture by impacting it with (i) a detonation wave or a high-velocity projectile plate or with (ii) a shock wave generated at an exterior surface of a container in which the mixture is disposed, by the impact of a detonation wave or a high-velocity projectile plate with such exterior surface. A "detonation wave" is the pressure wave produced by detonating an explosive.

The pressure of the shock wave to which the mixture is subjected depends, in part on which of the above methods is used to apply the shock pressure pluse to the mixture's surface. When an explosive is detonated in direct contact with the carbon mixture or its container, the shock pressure attainable with a given mixture depends on the detonation velocity of the explosive, the geometry of the explosive charge and its arrangement with respect to the carbon-containing mixture, and the manner in which the explosive is initiated. Explosive compositions detonating at velocities of about 8000 meters per second or higher, such as RDX, HMX, the cyclotols (RDX/TNT), octols (HMX/TNT), blasting gelatin, nitroglycol, nitroguanidine, PETN, and 70/30 nitrogen dioxide/nitrobenzene, can be used as a layer in direct contact with the carbon mixture or its container and plane-wave initiated to give pressures of about 300 kilobars in high-impedance materials. Higher pressure can be achieved by employing converging or intersecting shock waves, e.g., by placing a layer of explosive on each of two opposite surfaces of the mixture or its container and initiating the layers simultaneously; or by wrapping a layer of explosive around the surface of a cylindrical- or cone-shaped mixture or container and initiating the layer along an entire edge or at a point. One also can initiate a cylindrical charge of explosive by a concave wave to produce a plane detonation wave along the axis of the charge which propagates at a considerably higher velocity than the detonation velocity of the charge and which induces a considerably higher-pressure shock wave in a material. For example, J. Thouvenin and J. P. Argous reported in Compt. rend. 258, 1725–1727, Feb. 10, 1964, that a cylindrical charge of Composition B initiated by a concave wave generator gives a plane detonation wave having a velocity higher than 10,000 meters per second and capable of introducing a 1 megabar shock wave into a metal such as copper.

The method of generating high-pressure shock waves wherein a projectile plate is impacted against a surface of the carbon-cooling-medium mixture, or a container therefor, is capable of producing greater uniformity of shock intensity and is more effective for treating larger samples. On this basis, the projectile plate technique is preferred. A plate is impelled toward a free surface of the mixture or its container so that it collides with this surface thereby introducing a high-pressure shock wave into the material. The average shock pressure introduced into the mixture depends on the velocity and shock impedance of the projectile plate, and on the shock impedance of the mixture. The plate velocity is understood to be the velocity immediately before impact. If a container is employed, the pressure introduced into the sample depends also on the shock impedance of the container material and the distance between the surface of the mixture and the container collision surface, as well be described more fully hereinafter. Higher shock pressures are attained with higher plate velocities and higher-impedance plates and mixtures. Thus, for a given sample of carbon-cooling-medium mixture, the selection of a plate material and velocity will be made on the basis of the pressure desired.

The average shock pressure introduced into the mixture can be determined from the pressure-particle velocity relationships for the plate and for the mixture when a shock traverses the boundary between the two materials. The pressure and particle velocity are continuous across such interfaces, this continuity being represented as the intersection of two Hugoniot curves in the pressure-particle velocity plane (a curve which is the locus of all possible states which can be attained by shocking the material from the original state). One curve is for a forward-facing shock in the mixture starting at zero pressure and zero particle velocity, and the other curve is for a backward-facing shock in the projectile plate starting at zero pressure and particle velocity equal to the plate velocity. The shock pressure at the plate-mixture interface then is given by the intersection of the pressure-particle velocity Hugoniot curves for the forward-facing and backward-facing shocks.

When the projectile plate impacts against a surface of a container for the carbon-cooling-medium mixture, the pressure of the shock wave entering the container is determined by the same method, using in this case the intersection of the pressure-particle velocity Hugoniot curves for a forward-facing shock in the container material (starting at zero pressure and zero particle velocity) and a backward-facing shock in the projectile plate (starting at zero pressure and particle velocity equal to the plate velocity). The average shock pressure introduced into the mixture is then given by the intersection of the pressure-particle velocity Hugoniot curve for a forward-facing shock in the mixture (starting at zero pressure and zero particle velocity) and the isentropic expansion curve for the container material approximated by reflection of the Hugoniot curve, such curve passing through the previously found intersection point of the pressure-particle velocity curves for the projectile plate-container interface.

The Hugoniot curves for many materials are published and are readily available. If the Hugoniot curve for a given plate, container material, or sample is otherwise unavailable, it can be determined experimentally by the method of McQueen and Marsh (loc. cit.).

If the weight-fraction of carbon in the mixture is low and the carbon density is high, the shock pressure obtained with the mixture can be determined from the data for the cooling medium, since the shock impedance of the mixture differs very little from that of the medium. For mixtures containing a high weight-fraction of carbon, measurements can be made on the mixture to obtain the Hugoniot relationship, or an estimate can be made by the weighted addition of specific volumes on the Hugoniot curves of the carbon and the cooling medium at equal pressures. The Hugoniot curve for 95% dense natural graphite is given by B. J. Alder and R. H. Christian, loc. cit. Hugoniot curves for 97% dense pyrolitic graphite are given by D. G. Doran in Journal of Applied Physics, 34, 844–851 (1963); by N. L. Coleburn in U.S. Naval Ordnance Laboratory Report NOLTR 63–73, May 22, 1963; and by R. G. McQueen in Metallurgy at High Pressures and Temperatures, edited by K. Gschneider et al., Metallurgical Society Conferences, vol. 22, 1963, p. 91. The basically non-graphitic carbons will have substantially the same Hugoniot curve as natural graphite if they are of the same initial density.

As has been stated before, in the preferred, projectile-plate technique for generating high-pressure shock waves in the present process the shock pressure introduced into the carbon-cooling-medium mixture depends on the velocity and shock impedance of the projectile plate and on the shock impedance of the mixture as well as that of the cover plate, if present. Therefore, for a given plate material and carbon-containing mixture a simpler and more direct way of defining the requisite shock conditions is in terms of the plate velocity. We have found, for example, that in systems employing a steel projectile plate and cast iron as the carbon-containing mixture, plate velocities in the range of about from 3.2 to 6.5 kilometers per second can be employed, maximum yields being achieved with plate velocities in the range of about from 3.7 to 6 kilometers per second. The same range of plate velocities can be used with other materials having a shock impedance about the same as steel's at the same pressure (steel's impedance being about $4-5 \times 10^6$ dyne sec./cm.$^3$ at zero pressure), or when other carbon-cooling-medium mixtures are used in which the cooling medium is a high-impedance metal, the overall relative density of the mixture is greater than 90% (assuming carbon theoretical density=2.26 g./cc.), and carbon content is up to about 10% by weight.

In systems employing plate materials having a shock impedance close to that of steel and mixtures such as the carbon-steel shot compacts described in Examples 11–24, 29, and 30, in which the carbon density is low, i.e., about from 0.45 to 1.70 g./cc., plate velocities in the range of about from 2.3 to 5 kilometers per second can be employed, maximum yields being achieved with plate velocities in the range of about from 2.5 to 3.8 kilometers per second. On the other hand, in carbon-steel shot compacts in which the carbon density is high, for example those described in Examples 25–28, the useful plate velocity range approaches that given above for cast iron. Use of the Hugoniot curves for the plate material and the carbon-containing mixture permits a computation to be made of the plate velocities needed with a particular plate and mixture to achieve shock pressures in the required range.

As the distance between the shock front and the surface of the mixture at which the shock wave enters increases, the possibility of shock attenuation increases with consequent failure to achieve the necessary pressure throughout the depth of the mass. The depth that can be treated obviously depends on how long the required pressure can be maintained, i.e., on how far the shock wave can progress before it is overtaken by a rarefaction wave. For example, in the projectile plate technique, the shock front travels back into the projectile plate from the collision surface, reaches the back face of the plate, and is reflected back to the collision surface as a rarefaction wave, this wave then entering the carbon mixture and subsequently overtaking and attenuating the shock wave therein. In order to be able to determine for a particular set of conditions whether the rarefaction will overtake the shock wave in the carbon-containing mass, one must know the shock velocity ($U_s$) and rarefaction velocity ($U_r$) measured in the coordinate system at rest. The $U_r/U_s$ ratio increases with higher carbon content, greater porosity in the mixture, and higher conversions to diamond. Generally it is in the range of about 1.2 to 2, but it can be determined for the plate material and the mixture from $\rho/\rho_0$, the ratio of the density of the material behind the shock to that of the material ahead of the shock, and the sonic velocity, $C_H$, of the material on the Hugoniot curve, according to:

$$U_r = \frac{\rho}{\rho_0} \cdot C_H$$

Values for $U_r$ and $U_s$ can be calculated from the published values for $\rho/\rho_0$ and $C_H$ such as can be found in the McQueen and Marsh publication mentioned previously, or estimated from Hugoniot curves experimentally determined by the method described in that publication. Shock velocity values also can be found by measurement according to known techniques, such as smear or streak camera measurements. Knowing $U_s$ and $U_r$ for both the plate and the sample, the thickness of the plate, and the depth of the carbon-containing mass, one can determine whether the rarefaction will overtake the shock wave in the mass. If necessary, the condition can be remedied by choosing a thicker projectile plate while increasing the amount of explosive to maintain plate velocity, hence shock pressure, constant. Duration times of maximum pressure at the interface for steel projectile plates (SAE 1010) of various thicknesses and velocities are shown in the following table.

| Plate Thickness (in.) | Plate Velocity (km./sec.) | Shock Pressure on Impact with a Steel Plate (kilobars) | $U_s$ (km./sec.) | $U_r$ (assumed to be 1.2) $U_s$ (km./sec.) | Shock Duration (microsec.) |
|---|---|---|---|---|---|
| 0.1 | 2 | 430 | 5.46 | 6.55 | .85 |
| 0.1 | 3 | 710 | 6.50 | 7.80 | .72 |
| 0.1 | 4 | 1,070 | 7.84 | 9.40 | .59 |
| 0.2 | 2 | 430 | 5.46 | 6.55 | 1.70 |
| 0.2 | 3 | 710 | 6.50 | 7.80 | 1.44 |
| 0.2 | 4 | 1,070 | 7.84 | 9.40 | 1.18 |

Whether it is desirable that the shock wave traverse the entire mass of the sample before it is attenuated to a pressure below that needed to effect the carbon-to-diamond transition is an economic consideration, i.e., whether the increased yield obtained by increasing the duration of shock pressure will offset the added expense of the requisite additional amount of explosive.

To achieve the necessary cooling, the cooling medium must be in contact with the diamond particles formed. Therefore, if the carbon-cooling-medium mixture is non-self-supporting or is a solid which shatters excessively as a result of shocking, it may be necessary to confine the mixture in a shock-resistant container to hold the cooling medium in contact with the graphite particles. Such confinement is not required, however, with tough solids or with those which do not pulverize on shocking. With such solids, a protective cover generally will not be used since such an embodiment may impose an economic disadvantage with respect to the amount of carbon which can be treated at one time. If a container or cover is used, the thickness of the cover or the portion of the container between the impact surface and the surface thereof forming an interface with the carbon-containing mass must be considered in determining the conditions required to assure proper shock duration. In view of this and since the rarefaction velocity is higher than the shock velocity, the cover or at least that portion of the container between the collision surface and the said interface is as thin as possible, preferably from about 0.1 to about once the thickness of the projectile plate, and in no case thicker than about twice the thickness of the plate.

The particular method and assembly for generating the requisite shock wave and retaining the carbon mixture being treated do not form part of this invention. A method and assembly which are preferred for use with smaller samples as well as samples which shatter excessively, such as powder compacts, are described in copending, coassigned application Ser. No. 368,504, filed May 19, 1964 and now abandoned. With large, relatively tough samples, e.g., slabs of cast iron, the sample preferably is positioned directly on the ground, a bed of sand, or the like.

A typical arrangement for carrying out the process of this invention is shown in FIGURES 1 and 2. In the figures, 1 is a lead block having a central cavity 2 for retaining sample 3 of, e.g., cast iron. Spaced from the exposed surface of the sample and in alignment therewith is a projectile plate 4, which generally will have a shock impedance of at least about $10^6$ dyne-sec./cm.$^3$, preferably at least $3 \times 10^6$ dyne-sec./cm.$^3$, and a thickness of at least about 0.03 inch, preferably at least about 0.06 inch. A layer of high-velocity detonating explosive 5, e.g., one of the sheet explosives described in U.S. Patents 2,992,087 and 2,999,743, at a loading of at least about 25 grams per square inch is positioned adjacent the surface of plate 4 which faces away from the sample. The explosive layer is initiated by conventional means, preferably a plane-wave generator, to drive the projectile plate against the exposed surface of the sample at the required velocity to effect the graphite-to-diamond transition.

The mass of explosive used will, of course, depend on the desired plate velocity, the mass of the plate, and the escape velocity of the detonation products. The following table shows the velocities to which 10-inch-diameter flat circular steel (SAE 1010) plates of different thicknesses can be driven (in a distance of about 1½ inches) by 10-inch-diameter flat circular layers of explosive of different thicknesses (i.e., different masses of explosive). The explosive in this case is a sheet explosive described in U.S. Patent 2,999,743, which has a detonation velocity of about 7500 meters per second.

| Explosive Mass (g./sq. in.) | Plate Thickness (in.) | Plate Velocity (km./sec.) |
| --- | --- | --- |
| 25 | 0.09 | 2.6 |
| 25 | 0.30 | 3.7 |
| 50 | 0.21 | 2.4 |
| 50 | 0.12 | 2.9 |
| 50 | 0.06 | 3.7 |
| 100 | 0.27 | 2.9 |
| 100 | 0.15 | 3.5 |
| 100 | 0.09 | 4.1 |

Alternative to driving the projectile plate by means of an explosive charge in contact therewith, one can employ the plate acceleration method described in copending, coassigned application Ser. No. 343,057, filed Feb. 6, 1964, now U.S. 3,249,046. In this method the projectile plate has on its surface opposite that destined to impact the carbon-containing mass or its container, a lower-impedance layer which in turn is impacted by a plate having a higher shock impedance, the latter plate being impelled by any of various methods, e.g., detonation of an explosive, burning of a propellant in a gun, shock tube techniques, etc. This method is advantageous in that it permits higher plate velocities to be attained than are achieved by the explosive/plate technique described above.

Diamond particles are recovered from the mixture of diamond and cooling medium by first removing the medium, e.g., by filtering or centrifuging the sample in the case of liquid mediums or by dissolving the medium in the case of solids, e.g., with a mineral acid for most metals. Unconverted carbon is then removed from the resulting mixture of carbon and diamond by selectively oxidizing the carbon with oxygen in the presence of a catalytic amount of lead oxide, followed by removal of said oxide with an aqueous acid, e.g., acetic acid, as described in copending, coassigned application Ser. No. 373,109, filed June 5, 1964 and now abandoned in favor of continuation-in-part application Ser. No. 595,654, filed Nov. 21, 1966, and issued as U.S. Patent No. 3,348,918 on Oct. 24, 1967.

The present invention has been described with respect to a variety of inter-related factors which affect the carbon-to-diamond transition, so that the actual mechanics of the invention can be completely understood. It is evident, however, that the number of factors involved as well as the manner in which they are interrelated, makes it difficult to determine, without experimentation, the conditions which will best give effect to all factors in any given instance. Nonetheless, based on experience, it is believed that optimum or near optimum yields will be obtained if carbon particles are uniformly admixed with a cooling medium selected from the group consisting of iron, copper, nickel and alloys based on at least one of these metals; the density of the carbon particles, aggregates, or veins, as defined above, and cooling medium in the mixture is at least 20% and 90%, respectively; the over all sample density is at least 40%, and the cooling medium constitutes at least 35% by volume of the mixture; the mixture is subjected to shock pressure generated by impact of an explosively-driven, flat projectile plate moving at a velocity of about 2.3 to 6.5 kilometers per second against a surface of the mixture which is both flat and perpendicular to the direction of travel of the plate.

The optimum conditions for any weight ratio of carbon and a particular cooling medium are obtained by impacting the sample with a sequence of projectile plates moving at increasing velocities starting at 2.3 km./sec., or, with carbon at a density of 75% or higher, 3.2 km./sec., until the peak in the yield/plate velocity curve is obtained.

The following examples illustrate various embodiments of the present invention.

Example 1

The mixture of carbon and cooling medium used is a flat cylindrical disk of pig iron having a diameter of 9 inches, a thickness of 1 inch, and a density of about 7.0 grams per cubic centimeter, and consisting of 3.15% by weight of flake graphite, 10–25 microns thick, in a pearlite matrix. The graphite flakes are essentially nonporous, i.e., have a density of about 2.26 grams per cubic centimeter. Molten lead is cast around the iron disk to form a cylindrical block 26 inches in diameter and 12 inches in height, the disk and block being coaxial, and a flat surface of the disk being coplanar with the block's surface. A 10-inch-diameter low-carbon-steel (SAE 1010) circular plate having a 0.060-inch thickness has adjacent one of its flat surfaces a circular layer of Composition B having a diameter of 10 inches, a thickness of 5 inches and a density of 1.7 grams/cc. (24 pounds). The plate and block are axially aligned as in FIGURES 1 and 2 with the plate's other flat surface facing the block and spaced parallel therefrom by a distance of 1.5 inches. The plate-explosive assembly is held in place by means of wooden support blocks under the edges of the plate. The explosive layer is initiated by a plane-wave generator located at the surface of the explosive layer opposite the surface adjacent the plate, detonation of the explosive driving the plate so that it impacts the iron surface at a velocity of 5.47 kilometers per second. Impact of the steel plate with the pig iron disk introduces into the disk a shock wave at a pressure of 1850 kilobars. 91% of the fragmented, shocked pig iron is recovered. A random sample of iron fragments obtained is treated with 30% nitric acid to dissolve the iron. The remaining solids are treated with aqua regia to remove any traces of metal still present, and then with hydrofluoric acid, which dissolves the small amount of silica originating in the cast iron. The remaining solids (graphite plus diamond) are weighed, mixed with lead oxide powder, and the mixture is heated in air for 48 hours at 425° C. to oxidize the graphite. The lead oxide is then dissolved in acetic acid, and the solids are filtered off and treated with aqua regia to remove the last traces of contaminants. The solids are weighed again, and then subjected to X-ray diffraction procedures. The yield of diamond (weight of diamond in the random sample divided by weight of diamond plus graphite obtained before oxidation thereof) is 52.4%. Assuming the same yield for all of the recovered pig iron, the amount of diamond obtained is 540 carats, equivalent to 22.5 carats per pound of Composition B. The average diamond particle size is 8.3 microns.

Examples 2–4

The procedure of Example 1 is repeated with the exception that the thickness of the steel plate is changed. The results, computed as in Example 1, are given in the following table.

0.25-inch-thick sections. Pieces selected from each section are treated as follows: The piece is mixed with concentrated hydrochloric acid, which solubilizes the iron, forming ferrous chloride. The remaining solids are treated with hydrofluoric acid, which dissolves the small amount of silica originating in the cast iron. The remaining solids (graphite plus diamond) are treated as described in Example 1, except that the heating with lead oxide powder is effected in 24 hours. The pieces tested from the two top slices, after the described treatment, are found to consist of pure diamond. Slices three through seven contain substantially no diamond. The results are shown in the following table.

| No. of Piece | Origin of Piece | Wt. of Solids Before Oxidation of Graphite (g.) | Wt. of Diamond (g.) | Yield of Diamond |
|---|---|---|---|---|
| 1 | Top 0.25-in. slice | 8.09 | 4.09 | 52% a |
| 2 | do | 5.28 | 2.85 | |
| 3 | 2nd from top | 4.31 | 0.97 | |
| 4 | do | 3.60 | 1.21 | 32% b |
| 5 | do | 6.20 | 2.36 | | a Wt. of diamond/wt. of solids, total of Pieces 1 and 2.
b Wt. of diamond/wt. of solids, total of Pieces 3, 4, and 5.

Assuming the above yields are representative of all of the top two slices and that there is no diamond in the bottom five slices, the amount of diamond obtained in the totally recovered cast iron is 117 carats, or about 5 carats per pound of explosive. About 40% of the diamond recovered is larger than 10 microns in size.

Example 6

The procedure described in Example 5 is repeated except that the cast iron disk is 1.5 inches thick and the projectile plate is 0.225 inch thick. The plate velocity is 3.50 kilometers per second, and the shock pressure introduced into the cast iron is 840 kilobars. The disk is fractured after shocking. Pieces taken at random and subjected to the treatment described in Example 5 show a yield of diamond of about 12%. About 50% of the diamond recovered is larger than 10 microns in size.

Example 7

Ceylon natural graphite powder (42 grams) of a particle size such as to pass a 220-mesh screen (average particle size of about 30 microns) is mixed thoroughly with 785 grams of iron powder of a particle size as to pass a 325-mesh screen (average particle size of about 20 mi-

| Ex. No. | Plate | | Shock Pressure (kilobars) | Percent of Pig Iron Recovered | Diamond Yield | | |
|---|---|---|---|---|---|---|---|
| | Thickness (in.) | Velocity km./sec. | | | Percent of Carbon in Random Sample | Carats in Recovered Sample | Carats/lb. of Compn. B |
| 2 | 0.030 | 6.14 | ~2,300 | 93 | 14.6 | 155 | 6.5 |
| 3 | 0.090 | 4.63 | 1,400 | 90 | 40.2 | 410 | 17.0 |
| 4 | 0.178 | 3.65 | 970 | 90 | 34.1 | 350 | 14.6 |

The average diamond particle size in Examples 2, 3, and 4 is 7.4, 8.2, and 6.8 microns, respectively.

Example 5

The shock procedure of Example 1 is repeated except that the carbon mixture is a disk of nodular cast iron 6 inches in diameter, 2 inches thick and having a density of about 7.0 g./cc., which consists of 3% by weight of graphite in the form of 20–50 micron spheres dispersed in a ferrite matrix. The graphite spheres are essentially nonporous, i.e., have a density of about 2.26 g./cc. The lead block is 22 inches in diameter and 10 inches high. The steel plate is 0.090 inch thick. It impacts the cast iron surface at a velocity of 4.63 kilometers per second introducing into the disk a shock wave at a pressure of 1.4 megabars. The cast iron disk is fractured but is recovered completely and sliced parallel to the impact surface into seven crons). The powder mixture is pressed under 40 tons pressure into the cylindrical cavity in a 6-inch-diameter, 2-inch-high steel cup-shaped member to form a powder compact 4 inches in diameter and 1.5 inches thick. The steel cup-shaped member rests in a coaxial cavity in a lead block 22 inches in diameter and 8 inches in height, the diameter of this cavity being 6 inches. A 0.12-inch-thick cover plate made of steel is then placed over the compact, the powder mixture evacuated, and sealed off. A layer of the PETN sheet explosive described in U.S. Patent 2,999,743 and having a loading of 4 grams per square inch is positioned over the cover plate and is initiated at a point in the center thereof so as to compact the powder mixture. After compaction, the cover plate is removed, leaving the powder mixture as a compact with about 80% overall relative density (i.e., 80% of the density calculated on the basis of the volume which the same mixture would occupy were the components at 100% of their theoretical density). Then an explosive/projectile plate assembly such as that described in Example 1 is employed, the plate in this case being 0.125 inch thick and 5 inches in diameter and the layer of Composition B being 5 inches thick and 5 inches in diameter (6 pounds). Detonation of the explosive drives the plate so that it impacts the surface of the compact at a velocity of 4.1 kilometers per second, introducing into the compact a shock wave at a pressure of 1000 kilobars. After shocking, 736 grams of the compact is recovered (89%). A random sample is treated with concentrated hydrochloric acid to remove the iron, and the remaining solids (graphite plus diamond) are treated as described in Example 5. The amount of solids in the random sample before oxidation is 17 grams, and the amount of diamond recovered therefrom is 1.7 grams (10% yield). Assuming the same yield for all of the recovered sample, the amount of diamond obtained is 18.7 carats, or about 3 carats per pound of explosive.

Example 8

Twenty-four grams of spectrographic-grade artificial graphite powder and 894 grams of copper powder, both powders being of a particle size such as to pass a 326-mesh screen (average particle size of about 20 microns), are mixed thoroughly and the mixture is loaded into a steel ring (6-inch outside diameter, 4-inch inside diameter, 2-inch height) and pressed therein under 40 tons pressure to form a 4-inch-diameter, 0.9-inch-thick disk having a density of 5 grams per cubic centimeter. A 1-inch-thick steel plug fills the remainder of the cavity in the ring and is welded thereto. A 0.12-inch-thick cover plate made of low-carbon steel (SAE 1010) is placed over the disk, the powder mixture evacuated, and sealed off. The ring-compact assembly is surrounded by a steel ring having a 6-inch-inside diameter, 8-inch-outside diameter, and 2-inch height, which is mounted in a coaxial cavity in a lead block. The cavity is 8 inches in diameter and 2 inches high, and the block is 22 inches in diameter and 8 inches high. A layer of the PETN sheet explosive described in U.S. Patent 2,999,743 and having an explosive loading of 4 grams per square inch is positioned over the cover plate and is initiated at a point in the center thereof so as to compact the powder mixture to an overall relative density of about 80%. Then an explosive/projectile plate assembly such as that described in Example 1 is employed, the plate in this case being 0.125 inch thick and 5 inches in diameter and the layer of Composition B being 3.25 inches thick and 5 inches in diameter. Detonation of the explosive drives the plate at a velocity of 3.4 kilometers per second, introducing into the compact a shock wave at a pressure of 950 kilobars. After shocking, a sample is treated with nitric acid to remove the copper, and the remaining solids (graphite plus diamond) are treated as described in Example 5. The amount of solids in the sample before oxidation is 17.74 grams, and the amount of diamond recovered therefrom is 1.99 grams (11% yield).

Example 9

Spectrographic-grade artificial graphite powder in the 0–10 micron particle size range (8.4 grams) and 5–10 micron size aluminum powder (91.6 grams) are mixed thoroughly, and the mixture is hot-pressed at 500° C. and 2000 p.s.i. for 30 minutes to form eight 2-inch-diameter, 1-inch-thick compacts at 89% overall relative density. The compacts are symmetrically arranged on their ends inside a 1-inch-thick, 8-inch-diameter steel ring which is then filled with lead. The ring is placed in the cavity of a lead block as described in the preceding examples. An explosive/projectile plate assembly such as that described in Example 1 is employed, the plate in this case being 0.162 inch thick. Detonation of the explosive drives the plate at a velocity of 3.82 kilometers per second, which, upon impact, introduces a pressure of about 570 kilobars into the compacts. After shocking the sample is treated with a hot caustic solution to remove the aluminum, and the remaining solids (graphite plus diamond) are treated as described in Example 5. The amount of solids before oxidation is 3 grams, and the amount of diamond recovered therefrom is 0.462 gram, or 2.3 carats (15.4% yield).

Example 10

The procedure of the preceding example is repeated with the exception that the powder mixture used is comprised of 2.7% by weight of graphite and 97.3% by weight of nickel. The hot-pressing operation is carried out at 1200° C. and 4000 p.s.i. for 30 minutes. The overall relative density of the compacts is 93% and the shock pressure introduced into the compacts is about 980 kilobars. The amount of graphite plus diamond obtained after removal of the nickel by means of aqua regia, is 2.2 grams, and the amount of diamond recovered therefrom is 0.387 gram, or 1.9 carats (17.6% yield).

Example 11

Ceylon natural graphite powder (108 grams) of a particle size such as to pass a 220-mesh screen (average particle size of about 20 microns) is mixed thoroughly with 364 grams of steel shot (1 mm. in diameter). The mixture is loaded into a steel ring such as that described in Example 8 and pressed therein under 40 tons pressure to form a 4-inch-diameter, 0.526-inch-thick disk, having approximately 57 vol. percent graphite (particle density of 100%) and 43 vol. percent steel (particle density of about 7.7 g./cc.). The density of the graphite in the disk is computed from a graphite volume obtained by subtracting the volume of the steel shot, assumed to be at theoretical density, from the volume of the disk. Estimated in this manner, the graphite density is 78.5% of the theoretical. A steel plug is welded in the cavity of the ring as described in Example 8. A 0.12-inch-thick cover plate made of low-carbon steel (SAE 1010) is placed over the disk, the powder mixture evacuated, and sealed off. The ring-compact assembly is surrounded by a steel ring mounted in a lead block as described in Example 8. An explosive/projectile plate assembly such as that described in Example 1 is employed, the plate in this case being 0.167 inch thick, and the explosive being 5.5 inches thick. Detonation of the explosive drives the plate at a velocity of 3.75 km./sec. After shocking, a random sample is treated as described in Example 5. The amount of solids in the sample before oxidation is 9.62 grams, and the amount of diamond recovered therefrom is 2.53 grams, or 12.7 carats (26.3% yield).

Example 12

One hundred thirty grams of 200-mesh Ceylon natural graphite powder is mixed thoroughly with 870 grams of 70-mesh steel shot (mesh size designated by manufacturer, Pittsburgh Crushed Steel Company). The mixture is loaded into a steel ring (6-inch outside diameter, 4-inch inside diameter, 2-inch height) and pressed therein under 40 tons pressure to form a 4-inch-diameter disk having a thickness of 1.13 inches. Estimated as described in Example 11, the graphite density is 48% of the theoretical. A 0.12-inch-thick cover plate made of low-carbon steel (SAE 1010) is placed over the disk and an adjoining portion of the ring, the remainder of the cavity is filled with a one-inch-thick steel plug, and the mixture is evacuated by means of an evacuation tube provided in the plug. The ring-compact assembly is surrounded by a steel ring mounted in a lead block as described in Example 8. An explosive/projectile plate assembly such as that described in Example 1 is employed, the plate in this case being 0.370 inch thick. Detonation of the explosive drives the plate at a velocity of 2.95 kilometers per second. After shocking, the sample is treated as described in Example 1. 29.9% of the graphite is recovered as diamond plus unconverted graphite. Of this, 44 carats is diamond (23.3% yield).

Examples 13–24

The procedure described in Example 12 is repeated with the exception that variations are made in the plate thickness, steel shot size, and amount and density of graphite in the mixture (total weight of mixture is 1000 grams as in Example 12). The results are shown in the following table. Percent recovery of graphite, and yield in percent yield of diamond, have the same meaning as in Example 12.

| Ex. No. | Graphite | | Shot Mesh* Size | Plate | | Percent Recovery | Diamond Yield | |
|---|---|---|---|---|---|---|---|---|
| | Wt., g. | Density, Percent | | Thickness (in.) | Velocity, km./sec. | | Percent | Carats |
| 13 | 130 | 52 | 70 | 0.500 | 2.5 | -------- | 14.66 | -------- |
| 14 | 130 | 51 | 70 | 0.225 | 3.42 | 38.1 | 20.16 | 48.8 |
| 15 | 130 | 36 | 70 | 0.178 | 3.66 | 25.2 | 18.90 | 30.9 |
| 16 | 130 | 41 | 70 | 0.125 | 4.11 | 34.8 | 11.50 | 26.2 |
| 17 | 200 | 60 | 70 | 0.370 | 2.95 | 75.2 | 10.10 | 75.5 |
| 18 | 200 | 60 | 70 | 0.225 | 3.42 | 38.9 | 10.58 | 38.5 |
| 19 | 200 | 48 | 70 | 0.178 | 3.66 | 36.8 | 9.90 | 36.4 |
| 20 | 200 | 52 | 70 | 0.125 | 4.11 | 34.1 | 6.15 | 21.0 |
| 21 | 70 | 33 | 16 | 0.370 | 2.95 | 84.3 | 31.90 | 94.2 |
| 22 | 70 | 33 | 16 | 0.225 | 3.42 | 37.0 | 18.70 | 24.2 |
| 23 | 70 | 33 | 16 | 0.178 | 3.66 | 27.6 | 17.60 | 17.1 |
| 24 | 70 | 34 | 16 | 0.125 | 4.11 | 10.1 | 8.38 | 2.95 |

*Manufacturer's designated size, Pittsburgh Crushed Steel Company. Average diamond particle size ranges from 6 to 10 microns.

Examples 25–28

The procedure described in Example 12 is repeated with the exception that the disk, after pressing, is compacted explosively by the procedure described in Example 7. The results are given in the following table. Diamond yield in percent is based on the amount of diamond in the total amount of recovered carbon.

| Ex. No. | Graphite | | Shot Mesh* Size | Plate | | Diamond Yield, Percent |
|---|---|---|---|---|---|---|
| | Wt., g. | Density, Percent | | Thickness (in.) | Velocity km./sec. | |
| 25 | 130 | 86 | 70 | 0.370 | 2.95 | 2.5 |
| 26 | 130 | 88 | 70 | 0.225 | 3.42 | 22.4 |
| 27 | 130 | 87 | 70 | 0.178 | 3.66 | 21.4 |
| 28 | 130 | 86 | 70 | 0.125 | 4.11 | 20.7 |

*Manufacturer's designated size, Pittsburgh Crushed Steel Company.

Average particle size of the diamond is 7 microns.

Example 29

25 grams of commercial acetylene black, which has been heated at 1500° C. for 7 hours to drive off volatile impurities, is mixed with 475 grams of 16-mesh steel shot. A 0.125-inch thick cover plate is welded over the central opening in a steel ring (6 inches outside diameter, 4 inches inside diameter, and 2.5 inches thick) thus forming a cup-shaped cavity. The above mixture is loaded into this cavity and pressed under 50 tons pressure to give a compact 0.534-inch thick, giving a carbon density of 23%, estimated as in Example 11. A 4-inch diameter, 1-inch-thick steel plug is welded in the central opening of the ring, under 50 tons pressure. The plug is tapped and provided with an evacuation tube. The compact is out-gassed under vacuum at 400° C. for 20 hours and then sealed off. The ring-compact assembly is surrounded by a steel ring having a 6-inch inside diameter, 8-inch outside diameter, and 2½-inch height, which is mounted in a coaxial cavity in a lead block with the cover plate facing up. The cavity is 8 inches in diameter and 2.5 inches deep, and the lead block is 28 inches in diameter and 13 inches high. A layer of the PETN sheet explosive described in U.S. Patent No. 2,999,743 and having a loading of 4 grams PETN per square inch is positioned 1 inch above the cover plate by means of wooden blocks and the sides of the sheet taped to the block. The entire assembly is immersed in water so as to provide a one-inch water layer between the explosive and the cover plate, and the explosive center-initiated to explosively compact the acetylene black to a density of 53%, estimated as above. The assembly is removed from the water, after which an explosive projectile plate assembly, such as described in Example 1, is employed to shock the carbon/steel compact, the plate in this case being 0.375 inch thick and 10 inches in diameter. Initiation of the explosive propels the driver plate against the cover plate at a velocity of 3.4 kilometers per second. After shocking, a randomly selected sample is treated as in Example 1 to give 5.6 grams of carbon before oxidation. From this, 1.01 grams of diamond is obtained (18% yield). The average particle size of the diamond is 11.7 microns with a maximum of 35 microns.

Example 30

Example 29 is repeated except that the carbon is completely carburized Orlon®, the quantity of carbon and steel shot is doubled, the thickness of the compact after static pressing is 0.991-inch, and the carbon density after explosive compaction is 37%. The amount of carbon obtained from the randomly selected sample before oxidation is 9.95 grams. The amount of diamond is 1.91 grams (20% yield). The average particle size of the diamond is 9.5 microns with a maximum of 25 microns.

The diamond prepared according to the preceding examples contains only trace amounts of the metal cooling medium, i.e., copper in Example 8, aluminum in Example 9, nickel in Example 10, and iron in the remaining examples. X-ray studies of the shock-synthesized diamonds reveal that those synthesized from high-density graphite, that is, those prepared according to Examples 1–11 and 25–28, contain unique layer stacking sequences, i.e., sequences exhibiting hexagonal symmetry having the lattice dimensions $a=2.524$ A. and $c=4.122$ A., space grouping $D_{6h}^4$–$P6_3/mmc$., and containing four carbon atoms per elementary cell in the positions ⅓, ⅔, $z$; ⅔, ⅓, $\bar{z}$; ⅔, ⅓, ½+$z$; ⅓, ⅔, ½−$z$; with $z=\frac{1}{16}$. The stacking sequence is A, B, A, B (as contrasted to A, B, C, A, B, C in the cubic form of diamond), and the carbon atoms are arranged in tetrahedra with interatomic distances and bond angles identical to those observed in well-known cubic diamond. Based upon this structural analogy and considering that the crystals are transparent to visible light and that their hardness is the same as that of diamond composed entirely of the known cubic structure, this carbon modification is designated as hexagonal diamond in contrast to the crystalline but opaque and soft carbon modifications of different structure which are known as hexagonal and rhombohedral graphite.

The characterizing features of a typical X-ray powder diffraction diagram of the diamond are the cubic (111) reflection at a spacing of 2.061±0.01 A., which is enclosed between two hexagonal reflections, the hexagonal (100) reflection located at 2.186±0.01 A. and the hexagonal (101) reflection at 1.93±0.02 A. which, when superimposed on the cubic (111) reflection, forms a shoulder ranging from that reflection up to 1.895 A. spacing. The hexagonal (002) reflection coincides with the cubic (111) reflection and cannot be separated. Most particles of this shock-synthesized diamond are mixed structures of the cubic and hexagonal diamond phases. The presence of stacking faults is indicated by the broadening of hexagonal reflections $(hkl)$ with $h+k \neq 3n$ and $1 \neq 0$.

Some of the hexagonal reflections obtained in the electron diffraction diagram of the diamond crystal are the (100) reflection at a spacing of 2.18 A., (002) reflection at 2.06 A., (101) reflection at 1.935 A., (102) reflection at 1.505 A., (110) reflection at 1.26 A., (103) reflection at 1.175 A., and (112) reflection at 1.075 A.

Hexagonal diamond forms when the graphite in the graphite-cooling medium mixture is at high density, i.e., a density greater than about 75% of the theoretical, and conditions for maximum cooling prevail, i.e., the diamonds are small (sizes up to about 40 microns), and a sizeable amount of cooling medium is present (at least about 40 percent by volume). Moreover, the amount of the hexagonal phase formed varies as these conditions vary; higher-density graphite, smaller diamonds, and more cooling medium leading to larger amounts of hexagonal diamond. Generally, hexagonal diamond constitutes up to about 70% by weight of the product, with amounts down to about 5% being detectable by X-ray diffraction techniques. Typically, hexagonal diamond will account for about from 30% to 65% by weight of the diamond product shock-synthesized from high-density graphite.

We claim:

1. Process for synthesizing diamond from carbon, which comprises providing, in supported position, a substantially uniform solid mixture of carbon in intimate contact with at least about 15%, by volume, cooling medium; and applying a shock pressure pulse over at least one surface of said mixture to introduce into the mixture a shock wave of sufficient intensity to generate a temperature and pressure that will transform at least part of said carbon to diamond; the shock impedance and heat capacity of the cooling medium being such that the temperature induced therein by said shock wave is substantially less than the temperature of the diamond formed, whereby the diamond is instantly cooled; and the temperature differential between the diamond and cooling medium, and the amount of cooling medium, together being such that the diamond-cooling medium equilibration temperature is below about 2000° C.

2. A process of claim 1 wherein the cooling medium consists of at least one metal selected from the group consisting of iron, copper, nickel, aluminum, manganese, magnesium, tungsten, titanium and niobium, or an alloy based on at least one of said metals.

3. The process of claim 2, wherein said shock pressure pulse is applied to the surface of the carbon-containing mixture by impacting said surface with an explosively driven metal projectile plate having a shock impedance of about from $4 \times 10^6$ to $5 \times 10^6$ dyne-sec./cm.$^3$ and moving at a velocity of about from 3.2 to 6.5 kilometers/sec., and wherein the density of said mixture is at least about 90% of its theoretical density, and the carbon has a density of at least about 1.70 g./cc.

4. The process of claim 2 wherein said shock pressure pulse is applied to the surface of the carbon-containing mixture by impacting said surface with an explosively driven projectile plate having a shock impedance of about from $4 \times 10^6$ to $5 \times 10^6$ dyne-sec./cm.$^3$ and moving at a velocity of about from 2.3 to 5 kilometers/sec., and wherein the carbon has a density of about from 4.45 to 1.70 g./cc., and the cooling medium has a density of at least 90% of its theoretical density.

5. The process of claim 3 wherein said carbon is graphite.

6. The process of claim 3, wherein said mixture is cast iron and the plate velocity is about from 3.7 to 6 kilometers/sec.

7. The process of claim 3, wherein said mixture is compacted graphite powder and metal shot.

8. The process of claim 2, wherein said mixture is compacted graphite powder and metal shot.

9. A process of claim 2 wherein the density of said carbon is about from 0.45 to 2.26 g./cc., and the shock wave introduced into said mixture is at a pressure of about from 200 to 2000 kilobars, respectively.

10. A process of claim 1 wherein the cooling medium has a heat capacity of at least about 0.1 cal./g./° C. and a thermal conductivity of at least about 0.1 cal./sec./cm./° C.

11. A process for synthesizing diamond from carbon, which comprises applying a shock pressure pulse over at least one surface of a substantially uniform solid mixture consisting essentially of carbon in intimate contact with at least 15%, by volume, metal medium, thereby introducing a shock wave into said mixture, the shock pressure pulse and shock wave being of sufficient intensity to generate a temperature and pressure that will transform at least part of said carbon to diamond; and the metal medium being such that it will begin cooling the diamond at the instant it is formed and will rapidly reduce said diamond's temperature to below about 1800° C.

12. A process of claim 11 wherein the metal medium's density is at least 85% of its theoretical density, and the medium is iron, nickel, copper, or an alloy based on at least one of these metals.

References Cited

UNITED STATES PATENTS

| | | | |
|---|---|---|---|
| 3,207,582 | 9/1965 | Inoue | 23—209.1 |
| 3,238,019 | 3/1966 | De Carli | 23—209.1 |

OTHER REFERENCES

Bundy: "J. Chemical Physics," vol. 38, No. 3, 1963, pp. 631–643.

Hanneman et al.: "Science," vol. 155, Feb. 24, 1967, pp. 995–997.

Mantell: "Industrial Carbon," 2nd edition, 1946, D. Van Nostrand Co., Inc., pp. 211–212.

Ergun et al.: "Nature," vol. 195, Aug. 25, 1962, No. 4843, pp. 765–767.

Giardini et al.: "The American Mineralogist," vol. 47, November-December 1962, pp. 1393–1421.

OSCAR R. VERTIZ, *Primary Examiner.*

E. J. MEROS, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,401,019                                 September 10, 1968

George R. Cowan et al.

It is certified that error appears in the above identified patent and that said Letters Patent are hereby corrected as shown below:

Column 20, line 7, "4.45" should read -- 0.45 --.

Signed and sealed this 23rd day of June 1970.

(SEAL)
Attest:

Edward M. Fletcher, Jr.                     WILLIAM E. SCHUYLER, JR.
Attesting Officer                                 Commissioner of Patents